United States Patent
Palm

(10) Patent No.: US 7,224,723 B2
(45) Date of Patent: May 29, 2007

(54) HANDSHAKING COMMUNICATION SYSTEM AND METHOD FOR MULTIPLE XDSL

(75) Inventor: Stephen R. Palm, Fullerton, CA (US)

(73) Assignee: Broadcom Corporation, Irvine, CA (US)

( * ) Notice: Subject to any disclaimer, the term of this patent is extended or adjusted under 35 U.S.C. 154(b) by 828 days.

(21) Appl. No.: 09/916,653

(22) Filed: Jul. 30, 2001

(65) Prior Publication Data

US 2002/0041572 A1    Apr. 11, 2002

Related U.S. Application Data

(60) Provisional application No. 60/221,842, filed on Jul. 28, 2000.

(51) Int. Cl.
*H04B 1/38* (2006.01)

(52) U.S. Cl. .................................................. 375/222

(58) Field of Classification Search ............... 375/222, 375/141, 219, 259, 220, 465, 200, 377; 379/93.32; 709/237; 370/278, 282
See application file for complete search history.

(56) References Cited

U.S. PATENT DOCUMENTS

| | | | | |
|---|---|---|---|---|
| 5,048,054 A | * | 9/1991 | Eyuboglu et al. | 375/222 |
| 6,418,160 B1 | * | 7/2002 | Miller | 375/222 |
| 6,636,525 B1 | * | 10/2003 | Davis | 370/437 |
| 6,850,560 B2 | * | 2/2005 | Heusala | 375/222 |
| 2004/0146148 A1 | * | 7/2004 | Olafsson et al. | 379/93.32 |

FOREIGN PATENT DOCUMENTS

WO    WO 00/41354    7/2000

OTHER PUBLICATIONS

Mestdagh, D. J. G. et al., "Zipper VDSL: A Solution for Robust Duplex Communication Over Telephone Lines," XP-000949788, Piscataway, NJ, IEEE Communications Magazine, vol. 38, No. 5, May 2000, pp. 90-96.
"G.hs bis: G. vdsl and Implications to G.hs,", XP-002203784, Temporary Document HC-074, ITU-Study Group 15, http://www.kiwin.com/xdsl/HC-074.pdf, [internet], Jun. 28, 2002.
International Search Report for international application No. PCT/US01/23759, filed Jul. 30, 2001.

* cited by examiner

*Primary Examiner*—Young T. Tse
(74) *Attorney, Agent, or Firm*—Sterne, Kessler, Goldstein & Fox, P.L.L.C.

(57) ABSTRACT

A system and method for handshaking multiple xDSL technologies is provided. More particularly, the present invention provides a means for new xDSL technologies such as VDSL to negotiate usage of bidirectional frequencies while maintaining backward compatibility with legacy, i.e. non-VDSL modems. In an embodiment, a central office modem configured to operate using VDSL technology provides a modified signal to a remotely located modem. The modified signal provides capability indicators to the remotely located modem that indicate the central office modem is able to use the VDSL bidirectional frequencies. However, the modified signal also maintains sufficiently similar characteristics to traditional capability indicators so that it can be interpreted by legacy modems.

42 Claims, 7 Drawing Sheets

Remote xDSL initiated duplex start-up procedure

| Central xDSL Modem | | | | | | Remote xDSL Modem | | | | | | |
| --- | --- | --- | --- | --- | --- | --- | --- | --- | --- | --- | --- | --- |
| Capability | | Use | Select | | Capability | | | | | Operation | Case # |
| Up | Down | | Up | Down | Use | Up | Down | | | | |
| X | X | 0 | X | X | X | X | X | | | None | 1 |
| X | X | 0 | X | X | 1 | X | X | | | None | 2 |
| X | X | 1 | X | X | 0 | X | X | | | None | 3 |
| 1 | X | 1 | 1 | 0 | 1 | 1 | X | | | Up | 4 |
| X | 1 | 1 | 0 | 1 | 1 | X | 1 | | | Down | 5 |

VDSL Optional Band Usage

FIG. 3

Remote xDSL initiated duplex start-up procedure

Remote xDSL initiated duplex start-up procedure

HANDSHAKING COMMUNICATION SYSTEM AND METHOD FOR MULTIPLE XDSL

CROSS-REFERENCE TO RELATED APPLICATIONS

This application claims priority to US Provisional Application No. 60/221,842, filed Jul. 28, 2000, which is incorporated by reference herein in its entirety.

BACKGROUND OF THE INVENTION

Field of the Invention

The present invention is directed to a high speed communications device, such as, for example, but not limited to, an xDSL modem, a cable modem, a voiceband modem, a satellite communication system, a point-to-point wired or a wireless communication system or other high speed communications device which includes a handshaking or initializing protocol. More particularly, the present invention is directed to a system and method that provides means to handshake or initialize communication devices that operate in different frequency bands.

The present disclosure refers to the following Recommendations, Standards, drafts and contributions, the subject matter of which is expressly incorporated herein by reference in their entirety:

[G.992.1] Recommendation G.992.1 (formerly known as G.dmt), entitled "Asymmetrical Digital Subscriber Line (ADSL) Transceivers", published in June 1999 by the International Telecommunication Union.

[G.992.2] Recommendation G.992.2 (formerly known as G.lite), entitled "Splitterless Asymmetrical Digital Subscriber Line (ADSL) Transceivers", published in June 1999 by the International Telecommunication Union.

[G.994.1] Recommendation G.994.1, entitled "Handshake Procedures For Digital Subscriber Line (DSL) Transceivers", published in June 1999 by the International Telecommunication Union.

Most homes and businesses are connected to telephone networks using twisted pair copper wires. Until recently, these wires were used to carry data traffic in the analogue voice band. However, with the advancement of technology, particularly Digital Subscriber Line (DSL) technology, the transfer of data over the higher frequencies in the twisted pair copper wires is becoming more prevalent. The greatest advantage of DSL is that it enables data to be exchanged over the twisted pair copper wires at much higher speeds than conventional modems and analogue lines.

The term xDSL refers generally to DSL technology however, several variations of DSL technology exists. Asymmetric Digital Subscriber Line (ADSL) is the most familiar DSL technology. Other variations of xDSL technologies include, but are not limited to, High Speed Digital Subscriber Line (HDSL) and Very High speed Digital Subscriber Line (VDSL).

The recently developed higher speed xDSL technologies use different spectral allocations than prior xDSL technologies such as G.992.1 and G.992.2. In some cases, VDSL equipment may transmit energy in the band from 25 kHz to 138 kHz. The direction of transmission may be upstream or downstream. The ability to transmit and the direction of transmission must be identified and selected in a handshaking procedure. In previous xDSL technologies, a transceiver system did not have the option of selecting whether a band was upstream or downstream. Since VDSL technologies may have different spectral allocations than previous xDSL technologies and since some spectrum is not allocated to be strictly upstream only or strictly downstream only, new methods must be developed to handshake VDSL technologies while still retaining spectral compatibility and communication compatibility with the handshaking methods for existing xDSL technologies.

BRIEF SUMMARY OF THE INVENTION

The present invention provides a handshaking communication system that allows new xDSL technologies, such as but not limited to VDSL, to handshake while retaining backward compatibility with previous handshaking methods such as but not limited to ITU-T Recommendation G.994.1.

The present invention includes frequencies specifically designed to be spectrally compatible with VDSL and existing xDSL technologies. Further, the invention provides a novel method for using these frequencies to retain backward compatibility. The present invention also provides parameters for the handshaking messages that are specific to VDSL technologies.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 3 is an illustration of optional VDSL band usage in accordance with embodiments of the present invention.

Figure 1:
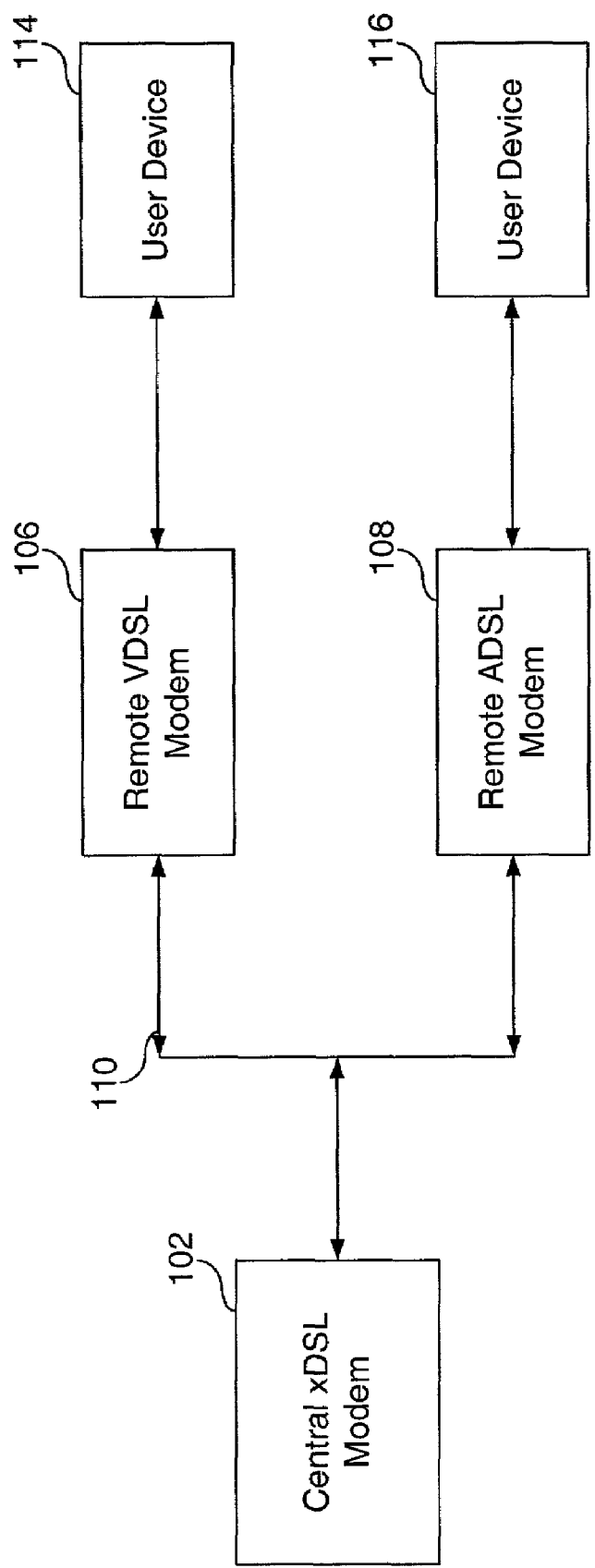
FIG. 1. is a high level block diagram of a communications sytem in accordance with embodiments of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Terminology

The following terms are defined so that they may be used to describe embodiments of the present invention. As used herein:

activating station refers to the DTE (Data Terminal Equipment), DCE (Data Communication Equipment) and other associated terminal equipment which originates an activation of an xDSL service;

carrier set refers to a set of one or more frequencies associated with a Power Spectral Density (PSD) mask of a particular xDSL Recommendation;

downstream refers to the direction of transmission from a telephone company's central office to a remote location such as a home or business;

initiating signal refers to the signal which initiates a startup procedure;

initiating station refers to the DTE, DCE and other associated terminal equipment which initiates a startup procedure;

message refers to framed information conveyed via modulated transmission;

responding signal refers to the signal sent in response to an initiating signal;

responding station refers to the station that responds to initiation of a communication transaction from the remote station;

session refers to an active communications connection, measured from beginning to end, between computers or applications over a network;

signal refers to information conveyed via tone based transmission;

signaling family refers to a group of carrier sets which are integral multiples of a given carrier spacing frequency;

splitter refers to the combination of a high pass filter and a low pass filter designed to split a metallic local loop into two spectral bands of operation;

terminal refers to a station;

Galf refers to an octet of value $81_{16}$, i.e. the ones complement of an HDLC flag;

transaction refers to a sequence of G.994.1 messages, ending with either a positive acknowledgment, a negative acknowledgment, or a time-out; and upstream refers to the direction of transmission from a remote business or home to a telephone company's central office.

EXEMPLARY SYSTEM EMBODIMENT

FIG. 1 is a high level block diagram of a communications system in accordance with embodiments of the present invention. The communications system 100 enables voice communications, video, and data services to be exchanged based on bidirectional transfer of Internet Protocol (IP) or Asynchronous Transfer Mode (ATM) traffic between a central xDSL modem 102 and a plurality of remote xDSL modems over a communications network 110.

The communications network 110 provides for the high-speed, reliable, and secure transport of data between the central xDSL modem 102 and the remote xDSL modems 106 and 108. As will be appreciated by persons skilled in the relevant arts(s), the xDSL modem functionality of 106 and 108 may be combined into a single modem or device. As will be appreciated by persons skilled in the relevant arts(s), the communications network 110 may comprise twisted-pair copper telephone lines, coaxial cable, fiberoptic cable, or a combination of coaxial cable and fiberoptic cable linked via one or more fiber nodes.

In accordance with an embodiment of the present invention, the central xDSL modem 102 is found within the central office of a local telephone company and the plurality of remote xDSL modems are found within individual homes and businesses. In the example communications system 100, only two remote xDSL modems 106 and 108 are shown. The remote xDSL modem 106 is shown as a remote ADSL modem and the xDSL modem 108 is shown as a remote VDSL modem. In general, any number and type of central or remote xDSL modem or communication networks may be included in the communications system 100 of the present invention.

Each of the remote xDSL modems 106 and 108 operates as an interface between the communications network 110 and at least one attached user device. In particular, the remote xDSL modems 106 and 108 perform the functions necessary to convert downstream signals received over the communications network 110 into IP or ATM data packets for receipt by an attached user device. Additionally, the remote xDSL modems 106 and 108 perform the functions necessary to convert IP or ATM data packets received from the attached user device 114 and 116 into upstream burst signals suitable for transfer over the communications network 110. As will be appreciated by persons skilled in the relevant arts(s), data other than IP or ATM packets may be carried over the communication system 100.

In the example communications system 100, each remote xDSL modem 106 and 108 is shown supporting only a single user device 114 and 116. In general, each remote xDSL modem 106 and 108 is capable of supporting a plurality of user devices for communication over the communications system 100. User devices may include personal computers, data terminal equipment, telephony devices, broadband media players, network-controlled appliances, or any other device capable of transmitting or receiving data over a communication network.

xDSL Technology

Figure 2:
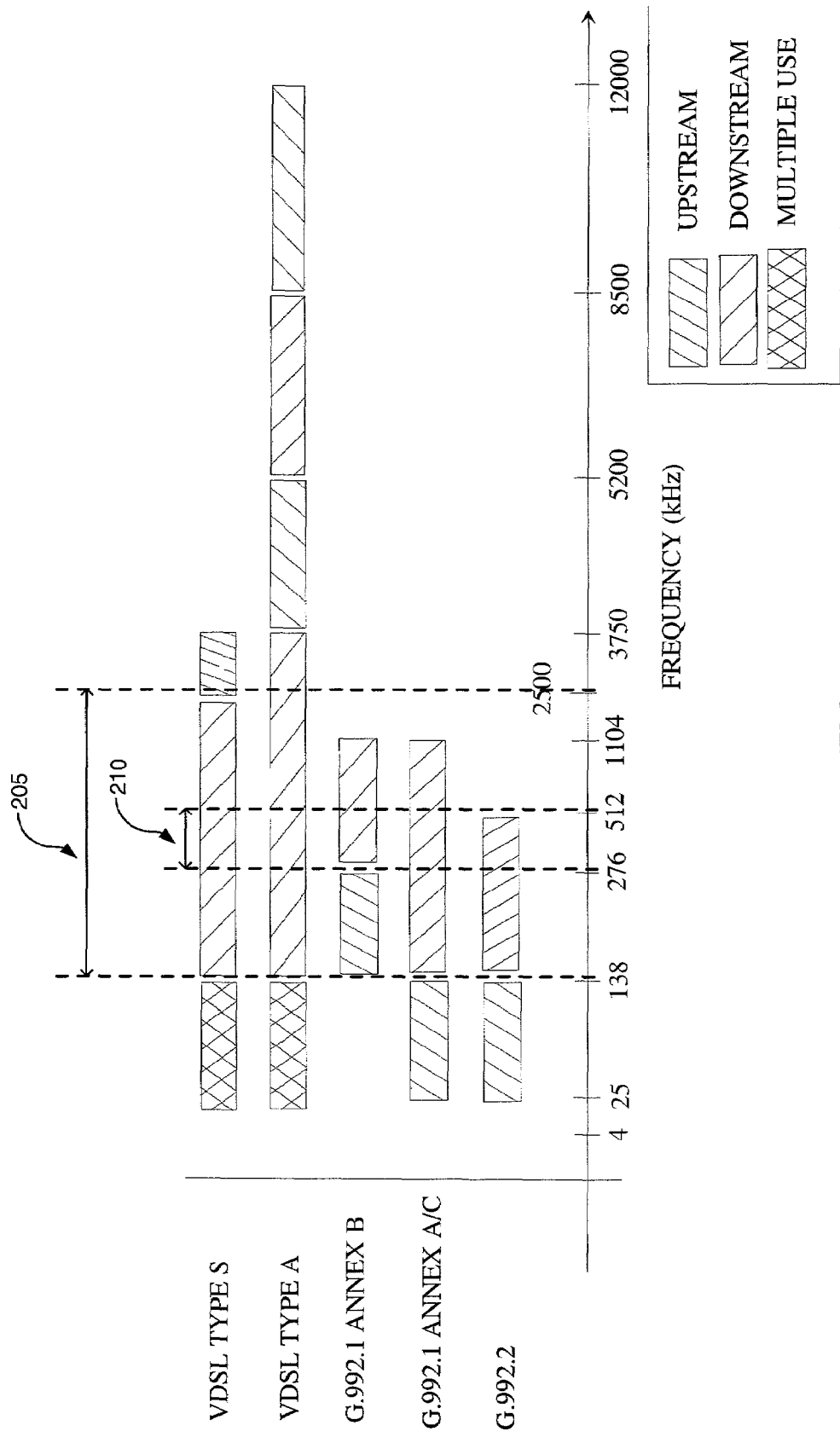
FIG. 2. is an illustration of spectral usage by various xDSL technologies.

Several of the xDSL technologies use Frequency Division Duplexing (FDD) by allocating non-overlapping portions of spectrum to separate upstream transmission from downstream transmission. FIG. 2 illustrates the spectrum used by some of the various xDSL technologies.

Referring to FIG. 2, G.992.2, also known as G.lite, uses the band from 25 kHz to 138 kHz for upstream transmission and the band from 138 kHz to 552 kHz for downstream transmission. Similarly, G.992.1 Annex A and Annex C use the band from 25 kHz to 138 kHz for upstream transmission, however they use a wider spectrum from 138 kHz to 1,104 kHz for downstream transmission. In comparison, VDSL technologies may use more than a single upstream and single downstream bands for transmission.

In FIG. 2, example VDSL technology spectral allocations are shown as Type A and Type S. In some cases, VDSL equipment may transmit energy in the band from 25 kHz to 138 kHz. As noted by the cross-lines, the direction of transmission may be in the upstream or downstream direction. Table 1 provides a representation of possible spectral allocations for Type A, Type E, and Type S VDSL modems in accordance with embodiments of the present invention.

TABLE 1

| | Sample spectral allocations by VDSL Type | | | | |
|---|---|---|---|---|---|
| | Mixed Use | Downstream | Upstream | Downstream | Upstream |
| Type A | 25–138 | 138–3750 | 3750–5200 | 5200–8500 | 8500–12000 |
| Type E | 25–138 | 138–3000 | 3000–5100 | 5100–7050 | 7050–12000 |
| Type S | | 138–2500 | 2500–3750 | | |

Since VDSL technologies have different spectral allocations than previous xDSL technologies and since some spectrum is not allocated to be strictly upstream only or strictly downstream only, new methods must be developed to handshake VDSL technologies while still retaining backward capability with the handshaking methods of existing handshaking technologies. In accordance with the present invention, modems configured to operate using VDSL technologies can handshake with other VDSL configured modems while at the same time maintaining an ability to handshake with modems that are unable to operate using VDSL.

Handshaking

The ability to transmit and the direction of transmission is identified and selected in a handshaking procedure. In previous xDSL technologies, a transceiver system did not have the option of selecting whether a band was upstream or downstream. Existing xDSL technologies such as G.992.1 and G.992.2, use ITU-T Recommendation G.994.1 "Handshake Procedures For Digital Subscriber Line (DSL) Transceivers", to handshake and initialize an xDSL communication session. Handshaking processes include selecting which xDSL technology will be used, and selecting and exchanging various related transmission parameters.

G.994.1 handshakes by using multiple redundant modulated frequency carriers to transmit digital messages. The G.994.1 frequency carriers were designed to be within the spectral allocations or PSDs of the xDSL Recommendations such as G.992.1 and G.992.2. These frequency carriers are shown in Table 2.

TABLE 2

Frequency Carrier sets for G.992.1 and G.992.2

| Carrier set designation | Upstream Carrier frequencies (kHz) | Downstream Carrier frequencies (kHz) |
|---|---|---|
| G.992.1 Annex A | 38.8125 | 172.5 |
| G.992.2 Annex A/B | 73.3125 | 241.5 |
|  | 107.8125 | 276.0 |
| G.992.1 Annex B | 159.5625 | 310.5 |
|  | 194.0625 | 379.5 |
|  | 228.5625 | 414.0 |
| G.992.1 Annex C | 30.1875 | 51.75 |
| G.992.2 Annex C | 38.8125 | 60.375 |
|  |  | 276.0 |

To initiate a handshake session for devices that include VDSL modems, communication must occur in some predetermined manner on some communication channel. It is observed that the receive power of higher frequency carriers is reduced due to the frequency dependent attenuation of the communication channel. Thus, carrier frequencies for VDSL modem handshaking should be selected to be as low frequency as possible in order to increase the effective distance of possible communication.

Due to the legacy handshaking methods and spectral compatibility considerations, the design space of a new means for handshaking is significantly limited. Various embodiments of the instant invention are described herein that address the different design criteria that are prioritized depending on the system installation and usage environment.

Downstream Carrier Frequency Selection

As can be seen in FIG. 2, the downstream carriers of the various types of VDSL have the band 205 from 138 kHz to 2500 kHz in common. It has been further observed that the band 210 from 276 kHz to 512 kHz is a common downstream band for all the xDSL technologies presented. Those characteristics make the band 210 suitable for downstream communication of handshaking signals.

In preferred embodiments, downstream carriers (i.e., frequencies) are selected from the set of carriers for G.992.1 Annex B or G.992.1 Annex A/C. These downstream carrier frequencies lie in the downstream spectral allocation of the various types of VDSL. In other words, as shown in FIG. 2, the downstream carrier frequency allocations of the VDSL technologies overlap the downstream spectral allocations of the other xDSL technologies.

From FIG. 2, it is further apparent that while G.992.1 Annex B downstream carriers are completely in common with VDSL and other xDSL downstream spectral allocations some legacy xDSL modems may not support transmission using G.992.1 Annex B. Thus, the use of G.992.1 Annex A/C carrier frequencies must be considered for legacy device compatibility.

At the time of a handshake sequence, the selection of used carriers is based upon the recommendation of Section 6.1 in G.994.1. More specifically, in the interest of explicitly indicating the presence of central xDSL modems 102 and remote xDSL modems 106 and 108 which might not have common modes, the initial transmission should use as many carriers as possible, and central xDSL modems 102 and remote xDSL modems 106 and 108 are encouraged to detect all carriers from all signaling families. Furthermore, it is advised to monitor for existing services prior to transmitting signals to avoid interfering with them.

Upstream Carrier Frequency Selection

The selection of VDSL upstream handshaking carrier frequencies is more problematic since the various types of xDSL technologies do not always have common upstream spectral allocation. For the Annexes in G.992.1 or G.992.2, this type of problem has been sub-optimally addressed by allocating different carrier frequencies for the different types of spectral allocations.

Several embodiments of selecting VDSL upstream handshaking carrier frequencies in accordance with the present invention will now be discussed. The remote xDSL modem 106 or 108 upstream handshake communication process may use one or more of the following embodiments in accordance with the present invention. The embodiments may be used sequentially in turn or simultaneously without departing from the scope of the present invention.

In a first embodiment of the present invention, upstream carriers (i.e. frequencies) for use with Type A and E VDSL systems are selected from the range of 3750 to 5100 kHz. Since no other existing standardized modems are operating in this range, the risk of collision due to concurrent upstream and downstream transmission is minimized. Thus, use of this frequency range allows dedicated frequencies at full transmission power. However, this alternative embodiment does not provide backwards compatibility with previous xDSL handshaking devices and some VDSL systems maybe installed with a splitter that prevents communication.

Table 3 shows the allocation of upstream carrier frequencies according to this first embodiment of the present invention. After reading this disclosure, a person skilled in the relevant art(s) will recognize that other frequencies may be used without departing from the spirit and scope of the invention.

TABLE 3

Upstream Frequencies

| Carrier set designation | Upstream Carrier frequencies (kHz) |
| --- | --- |
| VDSL Type A and E | 3864.0 |
| | 4416.0 |
| | 4968.0 |

In a second embodiment, reduced power spread spectrum upstream signals are used for VDSL systems that are able to use the spectrum from 25 to 138 kHz. The amount of power is reduced so that the upstream signal produces less noise in the band. This second embodiment allows handshake messages to be exchanged between the central xDSL modem 102 and the remote xDSL modem 106 or 108 but uses a modulation that is spectrally compatible with other communication services. This second embodiment may also be used in installation environments in which the VDSL optional band (25 to 138 kHz) is used for downstream signals. However, this second embodiment is not backwards compatible with previous xDSL handshaking devices and some VDSL systems may be installed with a splitter that prevents communication.

In a third embodiment, handshake messages are exchanged between the central xDSL modem 102 and a remote xDSL modem, for example remote xDSL modem 106. The handshake messages are used to determine via capability indications if the band between 25 to 138 kHz may be used for higher power communication between the remote xDSL modem 102 and the central xDSL modem 106. If the band may be used, the direction of use is also determined. FIG. 3 provides a summary of the optional VDSL capability indications and direction of use choices available in the 25 to 138 kHz frequency range.

In FIG. 3, five possible combinations of using the VDSL optional band (25 to 138 kHZ) are examined. In FIG. 3, a zero (0) is used to indicate that an option is not available nor selected. A one (1) is used to indicate that an option is available or selected, and an X is used to indicate indifference. FIG. 3 further indicates the capability to select a particular option. In a preferred embodiment, the central xDSL modem selects which of the available capabilities will be used and in what direction.

In case 1 and 2, the central xDSL modem does not indicate the capability to use the band between 25 to 138 kHz. Accordingly, a zero bit is represented in the use portion of the capability section for central xDSL. In other words, the central xDSL modem does not support the higher xDXL technologies such as VDSL. Communication in the band between 25 to 138 kHz is not possible even though the remote xDSL modem indicated its desire to use in case 2.

In case 3, the central xDSL modem indicates capability of using the 25 to 138 kHz frequency range and as indicated in the select portion, the central xDSL modem is indifferent as to the direction chosen. However, as noted by the zero in the use portion of the capability section for remote xDSL modem, remote xDSL modem is not capable of using the 25 to 138 kHz frequency range. In other words, in case 3, the central xDSL modem is able to support higher xDSL technology such as VDSL, but the remote xDSL modem is not.

In case 4, the central xDSL modem is capable of using the 25 to 138 kHz frequency range. Furthermore, as indicated by the value 1 in the up column, the central xDSL modem seeks to use the 25 to 138 kHz frequency range in the upstream direction. With respect to the remote xDSL modem, it too is capable of using the 25 to 138 kHz frequency range. Furthermore, as indicated by the value 1 in the up column, the remote xDSL modem seeks to use the 25 to 138 kHz frequency range in the upstream direction. Thus, in this scenario, both the central xDSL modem and the remote xDSL modem seek to handshake in the upstream direction using the higher xDSL technology, such as VDSL.

In case 5, the central xDSL modem is capable of using the 25 to 138 kHz frequency range. Furthermore, as indicated by the value 1 in the down column, the central xDSL modem seeks to use the 25 to 138 kHz frequency range in the downstream direction. With respect to the remote xDSL modem, it too is capable of using the 25 to 138 kHz frequency range. Furthermore, as indicated by the value 1 in the down column, the remote xDSL modem seeks to use the 25 to 138 kHz frequency range in the downstream direction. Thus, in this scenario the 25 to 138 kHz frequency range is not available for upstream handshaking.

Referring back to case 4, it has been observed that this scenario is the only case where both the central xDSL modem and the remote xDSL modem are both capable and willing to use the 25 to 138 kHz for handshake in the upstream direction.

Neglecting VDSL Type S, all central xDSL modem initiated handshake may use the downstream carriers of the first embodiment without concern for ADSL backwards compatibility, spectral compatibility nor availability of the VDSL optional band since those parameters are under the control of the central office. However, in many cases, handshake will be initiated by the remote xDSL modem. In the case of remote xDSL modem initiation of handshake, ADSL backwards compatibility, spectral compatibility, signal reach, and availability of the VDSL optional band must be considered.

Before the remote xDSL modem may use the VDSL optional band (25 to 138 kHz) for upstream handshaking transmission, the central xDSL modem must indicate usability and directionality. In previous handshaking schemes, such information was communicated with bits in messages. To preserve as much of the existing procedures and to have the information conveyed as early as possible to reduce handshaking duration, this third embodiment uses an information exchange prior to the message exchange. In accordance with embodiments of the present invention, a method for handshaking using a single bit or tone is used to inform the remote xDSL modem that it can, and in fact, should use the 25 to 138 kHz frequency range for upstream handshaking transmission.

Figure 4:
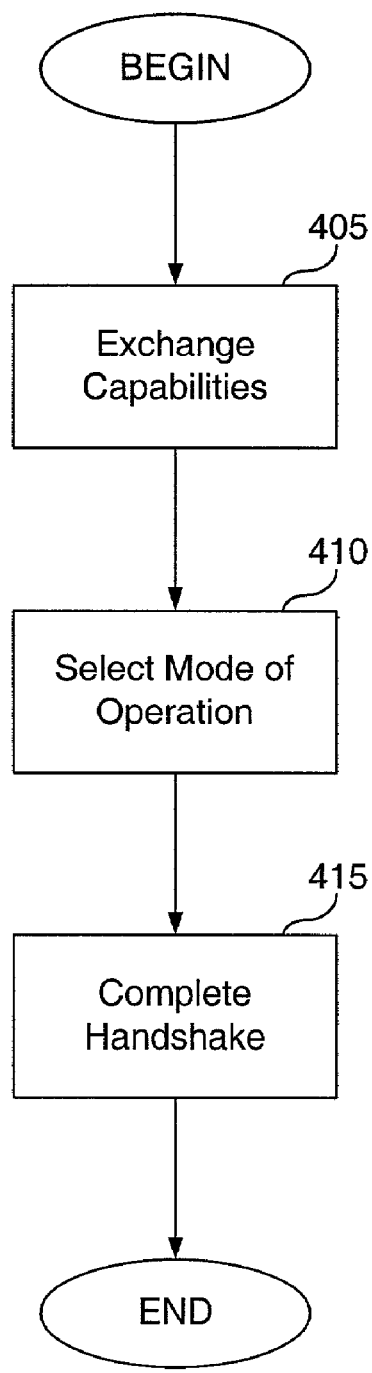
FIG. 4. is a flowchart of a method for handshaking xDSL modems in accordance with embodiments of the present invention.

FIG. 4 describes a method for handshaking multiple xDSL modems in accordance with embodiments of the present invention.

In a step 405 the central xDSL modem 102 and the remote xDSL modem 106 or 108 exchange capability indications. The exchange of capability indications will be further described with respect to FIG. 5.

Figure 5:
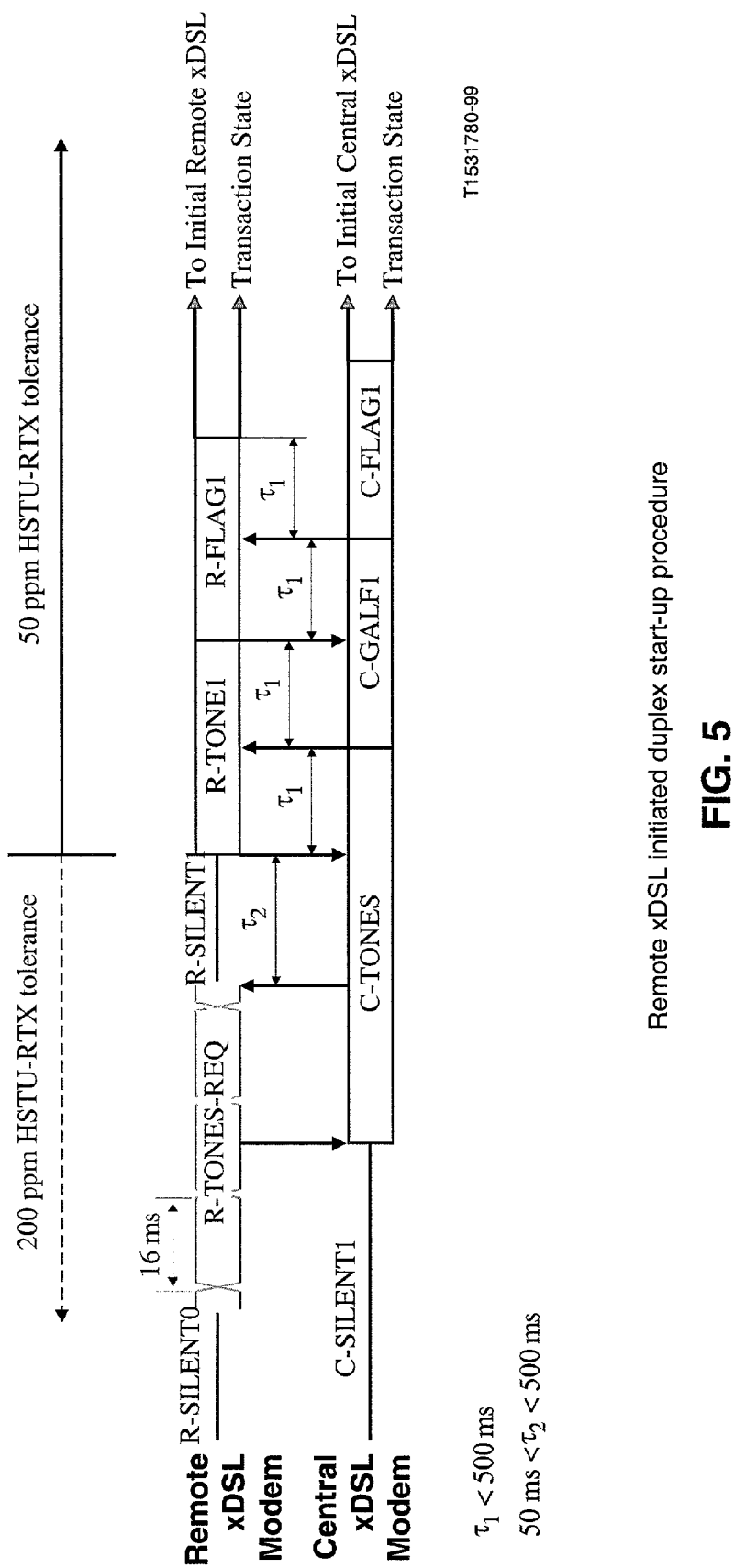
FIG. 5 is an illustration of a typical duplex start-up procedure initiated by a remote xDSL modem.

FIG. 5 illustrates the initial portion of a typical method of exchanging capability indications as described in ITU-T Recommendation G.994.1, "Handshake procedures for digital subscriber line (DSL) transceivers", section 11.1.1. The typical method of exchange will be described with reference to central xDSL modem 102 and remote xDSL modem 106 or 108. In this example, the remote xDSL modem 102 is in a state R-SILENTO and is therefore transmitting silence. Likewise, the central xDSL modem 106 or 108 is in a state C-SILENT1 and is also transmitting silence. The remote xDSL modem 106 or 108 is shown initiating the handshake process by transmitting signals, i.e., tones, from one or both of its signaling families, with phase reversals every 16 ms. These signals are identified as first signal (R-TONES-REQ). The first opportunity the central xDSL modem 102 has to communicate with the remote xDSL modem 106 or 108 is during C-TONES. C-TONES or standard capability indicators, are signals from the signaling families of central xDSL modem 102 that are transmitted to the remote xDSL modem 106 or 108 during handshake. Once the transmission of Standard capability indicator (C-TONES) has been detected by the remote xDSL modem 106 or 108, the remote xDSL modem 106 or 108 shall transmit silence (R-SILENT1) for 50 to 500 ms and shall then transmit a second signal(R-TONE1) from only one of its signaling family. When the central xDSL modem 102 has detected the second signal (R-TONE1), it shall respond by transmitting Galfs (C-GALF1)on modulated carriers. Once the remote xDSL modem 106 or 108 detects Galfs, Flags (R-FLAG1) is transmitted on modulated carriers. When the central xDSL modem 102 detects Flags, it shall respond by transmitting Flags (C-FLAG1). When the remote xDSL modem 106 or 108 has detected Flags, it shall begin the first transaction.

In accordance with the present invention, the typical capabilities exchange described with respect to FIG. 5 has been modified to allow for use of higher xDSL technologies such as VDSL, while maintaining compatibility with legacy xDSL modems (i.e. non-VDSL). Further description of this modification will now be described with reference to FIG. 6.

Figure 6:
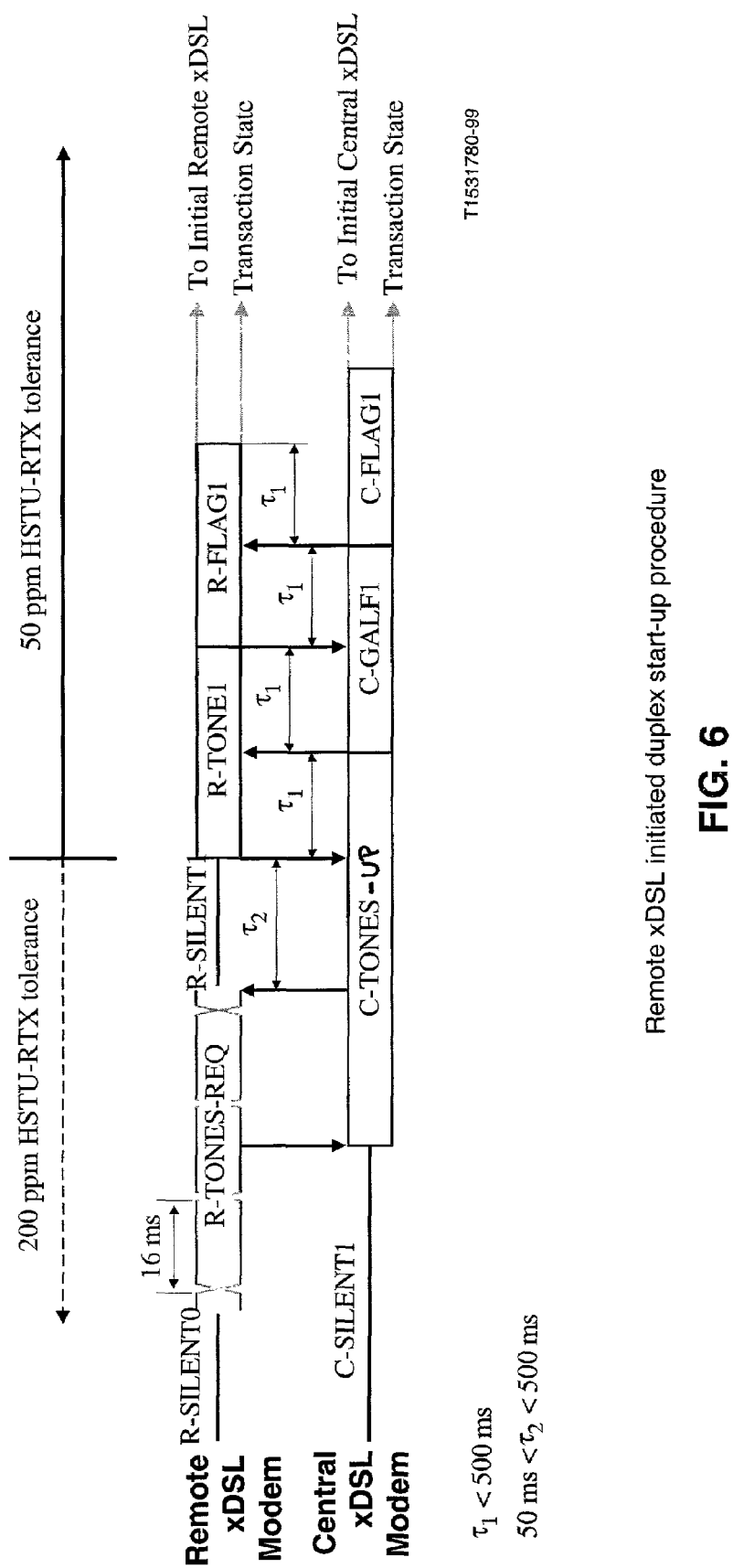
FIG. 6 is an illustration of a duplex start-up procedure initiated by a remote xDSL modem in accordance with embodiments of the present invention.

In FIG. 6, Standard capability indicator (C-TONES) has been modified in accordance with embodiments of the present invention. More particularly, a new signal modified capability indicator or C-TONES-UP is defined that has nearly identical characteristics to Standard capability indicator (C-TONES). Modified capability indicator (C-TONES-UP) is amplitude modulated, thereby providing a signal characteristic that indicates the central xDSL modem 102 is prepared to respond to VDSL optional band usability and upstream directionality. However, modified capability indicator (C-TONES-UP) retains enough signal characteristics to be detectable as Standard capability indicator (C-TONES) by legacy remote xDSL modems, such as remote xDSL modem 108.

In an embodiment, the period of modulation for modified capability indicator (C-TONES-UP) is 16 ms of amplitude at 1.2 times nominal power followed by 16 ms of 0.75 times nominal power. Other amplitudes, periods and characteristic modifications may be used with this invention as long as modified capability indicator (C-TONES-UP) retains characteristics so as to be detectable as Standard capability indicator (C-TONES) by legacy handshake equipment (e.g., xDSL modems unable to operate using the higher xDSL technologies, such as VDSL). In this way, the central xDSL modem 102 may transmit C-TONES-UP instead of C-TONES to indicate to the remote xDSL modem 106 or 108 that it may use the VDSL optional band for upstream transmission during handshake, provided it has VDSL technology.

Referring again to FIG. 4, in a step 410 the mode of operation is selected based on the capability indications exchanged in step 405. The mode of operation determines what frequency range will be used for handshake communications between the central xDSL modem 102 and the remote xDSL modem 106 or 108. The mode of operation further determines whether information will be exchanged in the upstream direction or the downstream direction. In a preferred embodiment, the central xDSL modem 102 selects the mode of operation, i.e. which of the available capabilities will be used and in what direction.

In a step 415, the central xDSL modem 102 and remote xDSL modem 106 or 108 complete their handshaking process with one another using the mode of operation selected in step 410. In the disclosed embodiment, the early conveyance of the capability indications and subsequent selection of the mode of operation help to reduce the duration of the handshaking process.

Table 5 provides a visual summary of the features of the above described embodiments of the present invention.

TABLE 5

Exemplary Embodiment Highlights

| Embodiment | Upstream Spectrum (kHz) | Modulation | Power | ADSL compatibility |
|---|---|---|---|---|
| First | 3750 to 5100 | DPSK | Full Power | Spectrum - No |
| Second | 25–138 | Spread Spectrum | Reduced Power | Spectrum - Yes Modulation - No |
| Third | 25–138 | DPSK | Full Power | Full |

A description of exemplary implementations in accordance with the present invention will now be described.

EXEMPLARY IMPLEMENTATIONS

Four exemplary implementations of embodiments of the present invention will now be described with reference to FIG. 6 and FIG. 7. These implementations are examples only and are not intended to limit the present invention.

In the first example, the central xDSL modem 102 and the remote xDSL modem 106 are each VDSL modems implementing the instant invention. The remote xDSL modem 106 initiates the handshaking process.

Proceeding in accordance with the flow shown in FIG. 6, the remote xDSL modem 106 transmits a first signal (R-TONES-REQ) comprised of signals from one or more of its signaling families. Accordingly, the first signal (R-TONES-REQ) could be comprised of signals in the range of 3750 to 5100 kHz or 25 to 138 kHz.

Next, the central xDSL modem 102 receives the first signal(R-TONES-REQ) and responds by sending an amplitude modulated signal identified as modified capability indicator or C-TONES-UP.

Next, the remote xDSL modem 106 receives the amplitude modulated signal C-TONES-UP and in response transmits a second signal (R-TONE1) comprised of signals from only one of its signaling families. The receipt of C-TONES-UP indicates that central xDSL modem 102 seeks to operate using the higher VDSL technology and because the remote xDSL modem 106 is also able to operate using the higher VDSL technology it recognizes the modified capability indicator C-TONES-UP and responds using a second signal (R-TONE1) in the range of 25 to 138 kHz. In this way the central xDSL modem 102 and remote xDSL modem 106 have exchanged capabilities (FIG. 4, step 405) and selected the mode of operation (FIG. 4, step 410).

Finally, the handshaking routine progresses to completion using legacy modulation (FIG. 4, step 415). In summary, both VDSL modems 102 and 106 have been initialized to handshake in the 25 to 138 kHz frequency range in the upstream direction.

In the second example, only the central xDSL modem 102 is a VDSL modem implementing the instant invention. Here again, the remote xDSL modem initiates the handshaking process.

Proceeding again in accordance with the flow shown in FIG. 6, the remote xDSL modem 108 transmits a first signal (R-TONES-REQ) comprised of signals from one or more of its signaling families. Accordingly, the first signal (R-TONES-REQ) could be comprised of signals in the range of 25 to 138 kHz or 276 to 1104 kHz.

Next, the central xDSL modem 102 receives the first signal (R-TONES-REQ) and responds by sending an amplitude modulated signal C-TONES-UP. C-TONES-UP is referred to interchangeably with modified capability indicator.

Next, the remote xDSL modem 108 receives the amplitude modulated signal C-TONES-UP and in response transmits a second signal (R-TONE1) comprised of signals from only one of its signaling families. For example, 25 to 138 kHz.

Although modified capability indicator (C-TONES-UP) indicates that central xDSL modem 102 seeks to operate using the higher VDSL technology because the remote xDSL modem 108 is not a VDSL modem it responds to modified capability indicator C-TONES-UP as if it were standard capability indicator C-TONES. As a result of the backward compatibility retained between the central xDSL modem 102 (VDSL modem) and remote xDSL modem 108 (ADSL modem) they are able to exchange capabilities (FIG. 4, step 405) and select the mode of operation (FIG. 4, step 410). Finally, the handshaking routine progresses to completion using legacy modulation (FIG. 4, step 415). In summary, central VDSL modem 102 and remote ADSL modem 108 have been initialized to handshake in the 25 to 138 kHz frequency range in the upstream direction.

In the third example, the central xDSL modem 102 and the remote xDSL modem 106 are each VDSL modems. However, in this example, the central xDSL modem initiates the handshake process.

Figure 7:
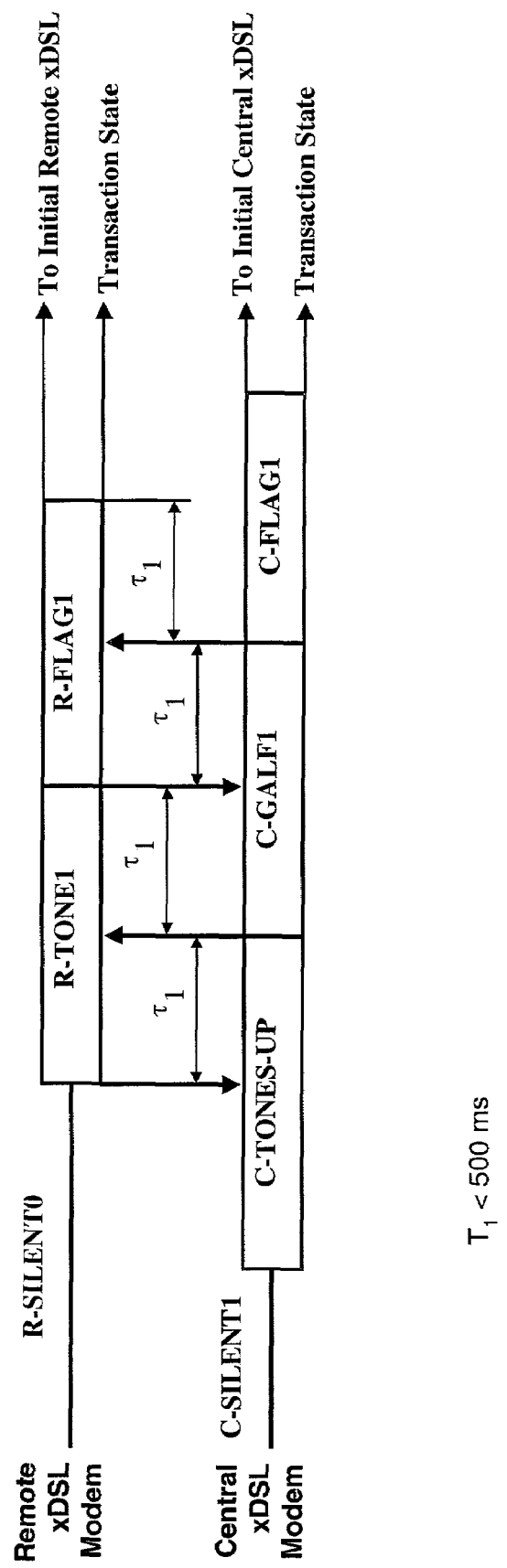
FIG. 7 is an illustration of a duplex start-up procedure initiated by a central xDSL modem in accordance with embodiments of the present invention.

Proceeding in accordance with the flow shown in FIG. 7, the central xDSL modem 102 sends an amplitude modulated signal C-TONES-UP. C-TONES-UP is referred to herein as a modified capability indicator.

Next, the remote xDSL modem 106 receives the amplitude modulated signal C-TONES-UP and in response transmits a second signal (R-TONE1) comprised of signals from only one of its signaling families. The receipt of C-TONES-UP indicates that central xDSL modem 102 seeks to operate using the higher VDSL technology and because the remote xDSL modem 106 is also able to operate using the higher VDSL technology it recognizes C-TONES-UP and responds using a signal second (R-TONE1) in the range of 25 to 138 kHz. In this way the central xDSL modem 102 and remote xDSL modem 106 have exchanged capabilities (FIG. 4, step 405) and selected the mode of operation (FIG. 4, step 410).

Finally, the handshaking routine progresses to completion using legacy modulation (FIG. 4, step 415). In summary, both VDSL modems 102 and 106 have been initialized to handshake in the 25 to 138 kHz frequency range in the upstream direction.

In the fourth example, only the central xDSL modem 102 is a VDSL modem. Here again, the central xDSL modem 102 is initiating the handshaking process.

Proceeding again in accordance with the flow shown in FIG. 7, the central xDSL modem 102 sends an amplitude modulated signal C-TONES-UP.

Next, the remote xDSL modem 108 receives the amplitude modulated signal C-TONES-UP and in response transmits a second signal (R-TONE1) comprised of signals from only one of its signaling families. For example, 25 to 138 kHz.

Although C-TONES-UP indicates that central xDSL modem 102 seeks to operate using the higher VDSL technology because the remote xDSL modem 108 is not a VDSL modem it responds to C-TONES-UP as if it were C-TONES. As a result of the backward compatibility retained between the central xDSL modem 102 (VDSL modem) and remote xDSL modem 108 (ADSL modem) they are able to exchange capabilities (FIG. 4, step 405) and select the mode of operation (FIG. 4, step 410). Finally, the handshaking routine progresses to completion using legacy modulation (FIG. 4, step 415). In summary, central VDSL modem 102 and remote ADSL modem 108 have been initialized to handshake in the 25 to 138 kHz frequency range in the upstream direction.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for handshaking modems over a communications network, comprising:

a central modem configured to generate a modified capability indicator from a standard capability indicator, said modified capability indicator being used to indicate that said central modem is able to select a direction of transmission over one or more frequency bands available for use by said central modem; and one or more remote modems able to recognize said modified capability indicator and in response, transmit a response signal over a carrier frequency selected from one of said one or more frequency bands available for use by said central modem.

2. The system of claim 1, wherein said direction of transmission is in an upstream direction and said carrier frequency is selected from the frequency band 25 kHz to 138 kHz.

3. The system of claim 2, wherein said standard capability indicator is amplitude modulated by said central modem to produce said modified capability indicator.

4. The system of claim 3, wherein said modified capability indicator is modulated for 16 milliseconds at 1.2 times nominal power followed by 16 milliseconds of 0.75 times nominal power.

5. A method for allocating carrier frequencies while handshaking modems over a communications network, the method comprising the steps of:
(i) transmitting a first signal over an initial upstream carrier frequency in one or more frequency bands available for use by a remote modem;
(ii) receiving a modified capability indicator generated from a standard capability indicator, said modified capability indicator being used to indicate that a central modem is able to select a direction of transmission over one or more frequency bands available for use by said central modem; and
(iii) in response to receiving said modified capability indicator, transmitting a second signal over an allocated upstream carrier frequency selected from one of said one or more frequency bands available for use by said remote modem, said allocated upstream carrier frequency also being within said one or more frequency bands available for use by said central modem.

6. The method of claim 5, wherein said allocated upstream carrier frequency is allocated from the frequency band 25 kHz to 138 kHz by said central modem.

7. The method of claim 6, wherein a downstream carrier frequency is allocated from the frequency band 276 kHz to 512 kHz, said frequency band 276 kHz to 512 kHz being selected from said one or more frequency bands available for use by said remote modem and also being selected from said one or more frequency bands available for use by said central modem.

8. The method of claim 7, wherein said initial upstream carrier frequency is in the frequency band 25 kHz to 138 kHz.

9. The method of claim 8, wherein said initial upstream carrier frequency is spread spectrum modulated by said remote modem.

10. The method of claim 8, wherein said initial upstream carrier frequency is differential-phase-shift-key modulated by said remote modem.

11. The method of claim 7, wherein said initial upstream carrier frequency is in the frequency band 3750 kHz to 5100 kHz.

12. The method of claim 11, wherein said initial upstream carrier frequency is differential-phase-shift-key modulated by said remote modem.

13. The method of claim 6, wherein said standard capability indicator is amplitude modulated by said central modem to produce said modified capability indicator.

14. The method of claim 13, wherein said modified capability indicator is modulated for 16 milliseconds at 1.2 times nominal power followed by 16 milliseconds of 0.75 times nominal power.

15. The method of claim 5, wherein said allocated upstream carrier frequency is in the frequency band 138 kHz to 276 kHz.

16. The method of claim 15, wherein said initial upstream carrier frequency is in the frequency band 138 kHz to 276 kHz.

17. The method of claim 16, wherein said initial upstream carrier frequency is differential-phase-shift-key modulated by said remote modem.

18. A method for allocating carrier frequencies while handshaking modems over a communications network, the method comprising the steps of:
(i) receiving at a central modem, a first signal transmitted over an initial upstream carrier frequency in one or more frequency bands available for use by a remote modem;
(ii) in response to said receiving step (i), generating at said central modem, a modified capability indicator from a standard capability indicator, said modified capability indicator being used to indicate that said central modem is able to select a direction of transmission over one or more frequency bands available for use by said central modem;
(iii) transmitting said modified capability indicator to said remote modem; and
(iv) receiving at said central modem, a second signal transmitted over an allocated upstream carrier frequency selected from one of said one or more frequency bands available for use by said remote modem, said allocated upstream carrier frequency also being within said one or more frequency bands available for use by said central modem.

19. The method of claim 18, wherein said allocated upstream carrier frequency is allocated from the frequency band 25 kHz to 138 kHz by said central modem.

20. The method of claim 19, wherein a downstream carrier frequency is allocated from the frequency band 276 kHz to 512 kHz, said frequency band 276 kHz to 512 kHz being selected from said one or more frequency bands available for use by said remote modem and also being selected from said one or more frequency bands available for use by said central modem.

21. The method of claim 20, wherein said initial upstream carrier frequency is in the frequency band 25 kHz to 138 kHz.

22. The method of claim 21, wherein said initial upstream carrier frequency is spread spectrum modulated by said remote modem.

23. The method of claim 21, wherein said initial upstream carrier frequency is differential-phase-shift-key modulated by said remote modem.

24. The method of claim 20, wherein said initial upstream carrier frequency is in the frequency band 3750 kHz to 5100 kHz.

25. The method of claim 24, wherein said initial upstream carrier frequency is differential-phase-shift-key modulated by said remote modem.

26. The method of claim 19, wherein said standard capability indicator is amplitude modulated by said central modem to produce said modified capability indicator.

27. The method of claim 26, wherein said modified capability indicator is modulated for 16 milliseconds at 1.2 times nominal power followed by 16 milliseconds of 0.75 times nominal power.

28. The method of claim 18, wherein said allocated upstream carrier frequency is in the frequency band 138 kHz to 276 kHz.

29. The method of claim 28, wherein said initial upstream carrier frequency is in the frequency band 138 kHz to 276 kHz.

30. The method of claim 29, wherein said initial upstream carrier frequency is differential-phase-shift-key modulated by said remote modem.

31. A method for handshaking modems over a communications network, the method comprising the steps of:
(i) receiving at a remote modem a modified capability indicator generated from a standard capability indicator, said modified capability indicator being used to indicate that a central modem is able to select a direction of transmission over one or more frequency bands available for use by said central modem; and (ii) in response to receiving said modified capability indicator, transmitting a signal over an allocated upstream carrier frequency selected from one of a plurality of frequency bands available for use by said remote modem, said allocated upstream carrier frequency also being within said one or more frequency bands available for use by said central modem.

32. The method of claim 31, wherein said allocated upstream carrier frequency is allocated from the frequency band 25 kHz to 138 kHz by said central modem.

33. The method of claim 32, wherein a downstream carrier frequency is allocated from the frequency band 276 kHz to 512 kHz, said frequency band 276 kHz to 512 kHz being selected from said plurality of frequency bands available for use by said remote modem and also being selected from said one or more frequency bands available for use by said central modem.

34. The method of claim 32, wherein said standard capability indicator is amplitude modulated by said central modem to produce said modified capability indicator.

35. The method of claim 34, wherein said modified capability indicator is modulated for 16 milliseconds at 1.2 times nominal power followed by 16 milliseconds of 0.75 times nominal power.

36. The method of claim 31, wherein said allocated upstream carrier frequency is within the frequency band 138 kHz to 276 kHz.

37. A method for handshaking modems over a communications network, the method comprising the steps of:

(i) generating at a central modem a modified capability indicator from a standard capability indicator, said modified capability indicator being used to indicate that said central modem is able to select a direction of transmission over one or more frequency bands available for use by said central modem;

(ii) transmitting said modified capability indicator from said central modem to a remote modem; and (iii) receiving a signal transmitted over an allocated upstream carrier frequency selected from one of said one or more frequency bands available for use by said remote modem, said allocated upstream carrier frequency also being within said one or more frequency bands available for use by said central modem.

38. The method of claim 37, wherein said allocated upstream carrier frequency is allocated from the frequency band 25 kHz to 138 kHz by said central modem.

39. The method of claim 38, wherein a downstream carrier frequency is allocated from the frequency band 276 kHz to 512 kHz, said frequency band 276 kHz to 512 kHz being selected from said one or more frequency bands available for use by said remote modem and also being selected from said one or more frequency bands available for use by said central modem.

40. The method of claim 38, wherein said standard capability indicator is amplitude modulated by said central modem to produce said modified capability indicator.

41. The method of claim 40, wherein said modified capability indicator is modulated for 16 milliseconds at 1.2 times nominal power followed by 16 milliseconds of 0.75 times nominal power.

42. The method of claim 37, wherein said allocated upstream carrier frequency is in the frequency band 138 kHz to 276 kHz.

* * * * *